United States Patent
Wolfe et al.

[11] Patent Number: 6,078,425
[45] Date of Patent: Jun. 20, 2000

[54] DURABLE SILVER COATING FOR MIRRORS

[75] Inventors: Jesse D. Wolfe, Discovery Bay; Norman L. Thomas, Livermore, both of Calif.

[73] Assignee: The Regents of the University of California, Oakland, Calif.

[21] Appl. No.: 09/329,145

[22] Filed: Jun. 9, 1999

Related U.S. Application Data

[60] Provisional application No. 60/088,683, Jun. 9, 1998.

[51] Int. Cl.[7] .................................................. G02B 1/10
[52] U.S. Cl. ...................... 359/584; 359/585; 359/884; 359/360; 427/162
[58] Field of Search .......................... 427/162; 359/900, 359/360, 584, 585, 838, 884; 428/623, 630, 631, 912.2

[56] References Cited

U.S. PATENT DOCUMENTS

| | | | |
|---|---|---|---|
| 3,486,217 | 12/1969 | Congleton et al. | 359/838 |
| 4,009,947 | 3/1977 | Nishida et al. | 359/884 |
| 4,643,518 | 2/1987 | Taniguchi | 359/359 |
| 4,963,012 | 10/1990 | Tracy et al. | 359/883 |
| 4,965,121 | 10/1990 | Young et al. | 428/213 |
| 5,019,458 | 5/1991 | Elgat et al. | 428/630 |
| 5,143,796 | 9/1992 | Sebastiano et al. | 359/585 |
| 5,215,832 | 6/1993 | Hughes et al. | 428/623 |
| 5,216,551 | 6/1993 | Fujii | 359/884 |
| 5,344,718 | 9/1994 | Hartig et al. | 428/623 |
| 5,361,172 | 11/1994 | Schissel et al. | 359/883 |
| 5,377,045 | 12/1994 | Wolfe et al. | 359/585 |
| 5,424,876 | 6/1995 | Fujii | 359/884 |
| 5,514,476 | 5/1996 | Hartig et al. | 428/426 |
| 5,521,765 | 5/1996 | Wolfe | 359/885 |
| 5,548,440 | 8/1996 | Hohenegger et al. | 359/360 |
| 5,557,462 | 9/1996 | Hartig et al. | 359/585 |
| 5,563,734 | 10/1996 | Wolfe et al. | 359/360 |
| 5,583,704 | 12/1996 | Fujii | 359/884 |
| 5,699,188 | 12/1997 | Gilbert et al. | 359/584 |
| 5,751,474 | 5/1998 | Hohenegger et al. | 359/360 |
| 5,789,847 | 8/1998 | Woodward et al. | 313/113 |

FOREIGN PATENT DOCUMENTS

| 0279201 | 11/1989 | Japan | 359/884 |
|---|---|---|---|

OTHER PUBLICATIONS

Reflectance and Durability of Ag Mirrors Coated with Thin Layers of $Al_2O_3$ Plus Reactively Deposited Silicon Oxide, G. Hass et al., Applied Optics, Nov. 1975, vol. 14, No. 11, pp. 2639–2644.

Highly Stable Silver Mirrors, E.A. Volgunova et al., Sov. J. Opt. Techol. 60(2), Feb. 1983, 1983 The Optical Society of America, pp. 128–129.

*Primary Examiner*—Cassandra Spyrou
*Assistant Examiner*—John Juba, Jr.
*Attorney, Agent, or Firm*—Daryl S. Grzybicki; Alan H. Thompson

[57] ABSTRACT

A durable multilayer mirror includes reflective layers of aluminum and silver and has high reflectance over a broad spectral range from ultraviolet to visible to infrared. An adhesion layer of a nickel and/or chromium alloy or nitride is deposited on an aluminum surface, and a thin layer of silver is then deposited on the adhesion layer. The silver layer is protected by a passivation layer of a nickel and/or chromium alloy or nitride and by one or more durability layers made of metal oxides and typically a first layer of metal nitride. The durability layers may include a composite silicon aluminum nitride and an oxinitride transition layer to improve bonding between nitride and oxide layers.

28 Claims, 3 Drawing Sheets

DURABLE SILVER COATING FOR MIRRORS

This patent application claims the benefit of priority of U.S. Provisional Patent application Ser. No. 60/088,683, filed Jun. 9, 1998.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a durable, highly reflecting silver and aluminum multilayer used for mirrors reflecting light over a wide spectral range from infrared to ultraviolet.

2. Description of Related Art

Reflective metal coatings, particularly those made of silver, are susceptible to attack by oxygen and constituents of atmospheric pollution, such as chlorine, sulfur, and ozone. When these substances react with the reflective coating, the silver layer becomes tarnished so that the required optical properties of that layer are lost. Specifically, the tarnish lowers the effective reflectivity of the coating, rendering it unacceptable where unattended high reflectivity mirrors are needed. In addition, silver is mechanically very soft and hence easily abraded. These abrasions can destroy the reflective surface by increasing the dispersion of light or simply by removing the reflective silver coating.

It is known in the art to apply protective layers to these silver layers, where the nature of the protective layer is determined by cost and the required properties of the coated substrate. For example, transparent silver layers, such as may be used in solar control coatings, are protected against corrosion by overcoating them with one or more transparent metal oxide layers. Many other methods of corrosion resistance have been developed using layers of a variety of organic and inorganic substances.

U.S. Pat. No. 5,361,172 to Schissel et al. discloses protective outer layers of polymeric material and a metal oxide layer, and an adhesive layer between the substrate and silver layer.

U.S. Pat. No. 5,699,188 to Gilbert et al. discloses a multilayered polymer film with a reflective metal layer.

U.S. Pat. No. 4,009,947 to Nishida et al. discloses a protective layer made of an alloy of copper and tin.

U.S. Pat. Nos. 5,548,440 and 5,751,474 to Hohenegger et al. describe a protective coating made of a zinc sulfide layer and an intermediate barrier layer made of an oxide, fluoride, or oxinitride.

U.S. Pat. Nos. 5,583,704 and 5,424,876 to Fujii disclose protective layers of oxides and chromium sulfide for silver and aluminum mirrors.

U.S. Pat. No. 4,963,012 to Tracy et al. discloses a protective diffusion barrier for metal mirrors provided by a layer of silicon nitride.

U.S. Pat. Nos. 5,514,476 and 5,344,718 to Hartig et al. disclose a transparent glass coating system that includes a layer of silver between layers of nickel or nichrome, with an overcoat and an undercoat of silicon nitride.

U.S. Pat. No. 5,019,458 to Elgat et al. discloses multilayers with alumina or chromium-nickel alloy on a substrate, silver deposited thereon, with zinc sulfide and oxides on top of the silver layer.

Wolfe et al. have designed durable thin film coatings that permit light transmission in the visible range while reflecting infrared radiation. U.S. Pat. Nos. 5,377,045 and 5,521,765 to Wolfe et al. disclose thin film designs having a first layer of oxide, a layer of nickel chromium alloy, a silver layer, another layer of nickel chromium alloy, and a top layer of silicon nitride. U.S. Pat. No. 5,563,734 to Wolfe discloses silver layers sandwiched between layers of nickel-chromium nitride and silicon nitride with a further oxide outer layer. These thin films are used as filters, or substrates that are transparent to visible light, but block out infrared radiation. These filters are used in display devices or transparent panels in buildings, vehicles, or other structures to prevent some, but not all, solar radiation from penetrating the substrate. Since the purpose of the filters is to transmit visible light, they are inadequate when the reflection of visible light, as well as infrared and ultraviolet light, is needed.

U.S. Pat. No. 5,215,832 to Hughes et al. discloses plate glass mirrors that reflect visible light and contain reflective metal layers and a zinc-containing polymeric protective layer (paint) on the back of a transparent glass substrate. Incident light passes through the glass substrate and is reflected back by the reflective metal layers underneath. Hughes et al. describe how a variety of metals or metallic compounds (chromium, copper, stainless steel, titanium nitride) might be used in combination to decrease the transmission of the final film. However, some of these materials have optical constants that make them absorbing, which reduces the reflectance of the mirror. In addition, they will not confer environmental durability to the mirror. Hughes et al. do not discuss the design of mirrors having high reflectance over a broadband of wavelengths, which is addressed by the present invention.

A need exists for reflective surfaces, or mirrors, that reflect light over a wide spectral region and are resistant to corrosion from contaminants or humidity. The present invention addresses the need for such mirrors, particularly in optical systems requiring high reflectance mirrors to maximize optical throughput. A thin film multilayer is provided using silver and aluminum layers in combination to reflect visible, ultraviolet, and infrared light.

SUMMARY OF THE INVENTION

The present invention provides a durable thin film multilayer coating for mirrors reflecting over a wide spectral region of infrared, visible, and ultraviolet light. The coating comprises silver and is deposited on an aluminum or aluminum-coated substrate. The coating includes at least five layers: an aluminum layer, an adhesion layer, a silver layer, a passivation layer, and a durability layer. The adhesion and passivation layers are composed of nickel, chromium, nickel-chromium alloy, nitrides of nickel or chromium, or a nickel chrome nitride ($NiCrN_x$). The durability layer comprises a first layer of silicon nitride and/or aluminum nitride, typically followed by one or more layers of metal oxides. Additionally, the durability layer may comprise an oxinitride transition layer between the nitride layer and the overlying oxide layer.

The object of the invention is to produce highly reflective broadband optical mirrors having scratch and tarnish resistance. The combination of silver and aluminum metal layers render the coating highly reflective from about 300 nm to 10,000 nm, i.e., ranging from ultraviolet to infrared. Aluminum has high reflectivity from about 200 nm to 10000 nm, with a dip in reflectivity at 850 nm. Silver complements the reflectivity of aluminum by having the highest reflectivity of any metal from 400–10000 nm. By combining an aluminum layer with a thin film of silver, high reflectance may be achieved over the whole range of 300–10000 nm, and possibly down to 200 nm.

High reflectance is a crucial property for multi-mirror applications since the optical throughput of an optical system is a product of the reflectance of each reflective surface. Thus, to improve throughput, it is critical to maximize the reflectance of each mirror. The present invention provides mirror coatings that optimize reflectance while maintaining high durability.

Silver coatings are often not used in optical mirror systems due to its tendencies to be very soft and thus form a fragile system, and to corrode over time due to atmospheric contaminants. The present invention addresses both of these weaknesses with a reflective coating capable of rendering high reflectance and long-term (e.g., 30 years) tarnish resistance. An object of this invention is to provide a coating that protects the silver layer from corrosion and produces a mirror that is very hard, durable, and resistant to atmospheric contaminants, abrasion, immersion in acid baths, and cosmic radiation or dust. It is further an object of this invention to provide a mirror that can be used in a wide variety of surroundings or climates, or designed for a particularly harsh or extreme environment (e.g., high humidity, outer space, volcanically active areas, marine areas, or the desert).

Another object of the invention is to provide a flashlamp reflector mirror for atmospherically operated, high intensity flashlamps in the DOE National Ignition Facility at Lawrence Livermore National Laboratory. The present invention could also be used for laser reflectors, facsimile machines, projection television screens, telescope mirrors, or in any device that requires a highly reflective surface in the ultraviolet, visible, and infrared wavelength regions.

Other objects and advantages of the present invention will become apparent from the following description and accompanying drawings.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

The present invention is a silver and aluminum based thin film multilayer mirror that has high reflectance at various angles of incidence and over a broad spectral range, and displays exceptional environmental durability. The combination of aluminum and silver metal layers produces the high reflectance over a large spectral range of wavelengths from 300–10000 nm, which covers ultraviolet, visible, and infrared light. The reflected wavelengths may extend down to 200 nm.

Figure 1:
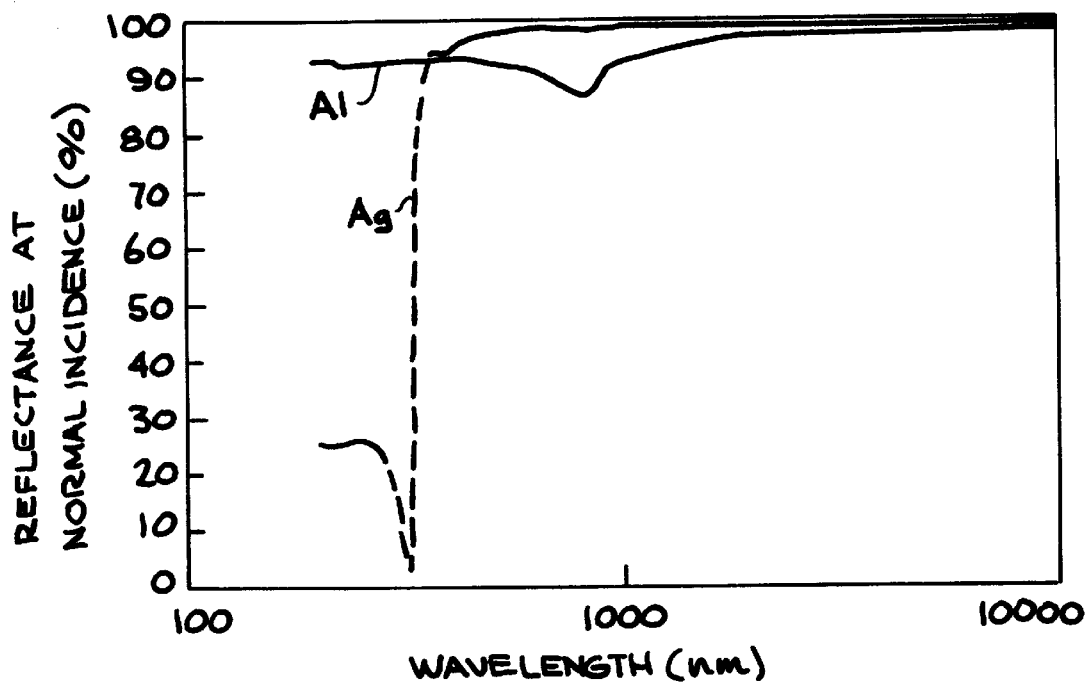
FIG. 1 shows the reflectance of aluminum and silver as a function of wavelength.

FIG. 1 shows the maximum theoretical reflectance at normal incidence of aluminum and silver as a function of wavelength. Aluminum has high reflectance from about 200 nm to 10000 nm, even in the ultraviolet, but with a deep dip in reflectivity at 850 nm due to interband transitions. The reflectance of a highly polished aluminum surface is approximately 90% in the near ultraviolet and visible portion of the spectrum. Silver complements the reflectivity of aluminum by having the highest reflectance of any metal from 400–50000 nm. The reflectance of silver in the ultraviolet, visible, and infrared portion of the spectrum is approximately 98%, but the reflectance drops off sharply below 400 nm in the ultraviolet.

By placing a thin film of silver on top of an aluminum surface, the reflectance in the ultraviolet is increased by the reflectance of the aluminum as seen through the silver, while the visible and infrared is reflected by the silver. Thus, ultraviolet light below 400 nm passes through the silver layer, only to be reflected by the aluminum layer down to about 200 nm, and then passes through the silver layer and out of the multilayer coating. The aluminum reflectivity dip at 850 nm is never experienced due to the silver overcoat, which is highly reflective at 850 nm. The present invention takes advantage of the optical performance of aluminum substrates and silver thin films by combining an aluminum layer with a thin film of silver, so high reflectance can be achieved over the entire range of 300–10000 nm.

Polarization effects can reduce reflectance, and these effects vary with each metal and the angle of incidence of the light. The effect of polarization on reflectance is minimized as the intensity of reflected light is increased and maintained over wide bandwidths. Since the use of the aluminum substrate/silver film combination maintains high reflectance over a broadband, the combination is advantageous for reducing these effects. Silver has a higher reflectance and less polarization splitting than aluminum in the visible portion of the electromagnetic spectrum, and the reverse is true in the ultraviolet region.

High reflectance can be crucial, particularly in multi-mirror applications. The loss of a single percent, or even a fraction of a percent, in reflectance can significantly affect the overall reflectivity of a multi-mirror system since the optical throughput of an optical system is a product of the reflectance of each reflective surface. For example, a system with four mirrors each having a reflectance of 92% will reflect only $(0.92)^4$, or 72%. A drop in reflectance to 91% results in a total reflectance of 68%. Thus, to optimize throughput in reflective optical systems, the reflectance of each mirror should be maximized.

The thickness of the silver layer is typically on the order of 10–100 nm (100–1000 Å). This thickness is large enough to be highly reflective at the 850 nm dip in aluminum reflectivity, yet is thin enough to permit ultraviolet transmission below 400 nm, so that the aluminum surface may effectively reflect in the ultraviolet. Another consideration in choosing the thickness of the silver layer is that the mechanical durability of a soft film decreases as its thickness is increased. Therefore, silver films that are 40 nm thick are more durable than films 100 nm thick. In addition, it is easier to improve the hardness of a thin film than a thick film. Thin films of silver (10–20 nm) can be fabricated so as to pass a 50 Tabor abrasion test, while thicker films (100 nm) can barely pass the 50 cheesecloth test. This effect is described in Wolfe et al. U.S. Pat. No. 5,377,045, which is hereby incorporated by reference.

The aluminum layer must be of sufficient thickness to reflect the light passing through the overlying layers. The substrate itself may be made of highly polished aluminum, or an aluminum layer of at least 70 nm (700 Å) can be deposited on a substrate. Suitable materials for substrates include anything to which an aluminum layer can be applied, such as metals, semiconductors, glass, ceramics, or plastic.

Figure 2:
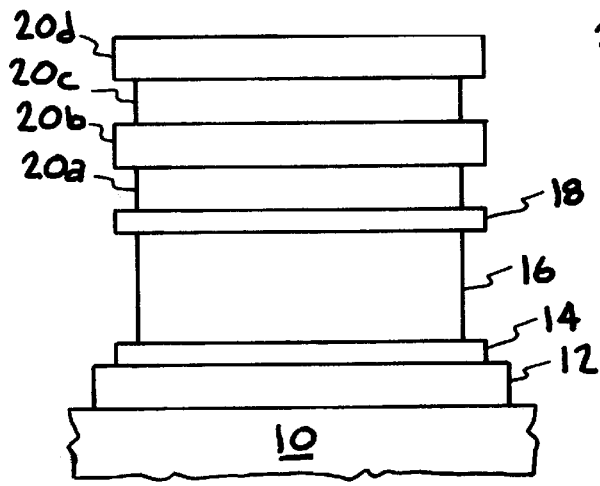
FIG. 2 shows a cross-section of a thin film multilayer mirror according to the present invention.

FIG. 2 shows a cross-section of a thin film multilayer coating on a substrate according to the present invention. In this embodiment, an aluminum layer 12 is deposited on a substrate 10. An adhesion layer 14 is then deposited on the aluminum layer 12. The silver layer 16 is deposited next, and then a passivation layer 18 overlays the silver layer 16. The top layer or layers are durability layers 20a, 20b, 20c, 20d, which are comprised of metal oxides. The first durability layer 20a is typically a metal nitride. Multilayer mirrors such as shown in FIG. 2 have been made and tested, resulting in scratch-resistant and atmospherically tarnish-resistant mirrors.

The adhesion layer 14 facilitates the adhesion of silver to the aluminum layer 12; thin layers of silver are difficult to deposit on aluminum. The adhesion layer 14 is comprised of nickel or chromium metal, an alloy of nickel and chromium (NiCr), a nitride of nickel or chromium ($NiN_x$, $CrN_x$), or a composite nitride of nickel-chromium ($NiCrN_x$). Since the stoichiometry of the nitride may not be known or is variable, the nitride is denoted as $N_x$. The preferred adhesion layer materials are NiCr alloys and $NiCrN_x$.

The proportions or ratio of nickel to chromium by weight (Ni:Cr) in the adhesion layer can vary over the entire range, i.e., all points between 100%Ni to 100%Cr. The selection of the Ni:Cr ratio for NiCr and $NiCrN_x$ is determined by the application of the mirror. Nickel is more chemically inert than chromium and lends greater durability. In addition, nickel forms metallic bonds with the underlying aluminum metal and overlying silver layer. A high ratio (e.g., 80Ni:20Cr) is used when environmental durability is important, such as in a desert or marine environment. In contrast, a lower ratio (e.g., 20Ni:80Cr) can be used in space applications, such as telescope mirrors.

Another consideration in choosing the Ni:Cr ratio is the absorption of the alloy. The absorption of light by a layer (i.e., 1−(reflectance+transmission)) is a function of the optical constants (index of refraction and extinction coefficient) of the material forming the layer. A NiCr layer with a weight ratio of 80Ni:20Cr has higher absorption than a $NiCrN_x$ film of the same thickness. By changing the ratio of Ni:Cr to 20:80, the absorption of the film is decreased by 1% or more. The lower absorption allows more reflection from the aluminum film underneath.

The thickness of the adhesion layer is typically in the range of about 0.5–5.0 nm if a pure metal or NiCr alloy is used, and about 0.4–1.0 nm if $NiN_x$, $CrN_x$, or $NiCrN_x$ is used. Nickel-chromium nitrides ($NiCrN_x$) can be formed into thin layers, which is advantageous since thin layers absorb less light (and thus have a less adverse effect on reflectance). The preferred embodiment for the adhesion layer is a thin film of $NiCrN_x$ having a thickness of about 0.5–1.0 nm (5–10 Å) and Ni:Cr ratio of about 20Ni:80Cr. At this thickness, the film may not be continuous across the entire aluminum layer. A continuous layer is not necessary as the layer still serves to facilitate the bonding of the silver layer onto the aluminum.

The NiCr or NiCrNx layers may be sputtered onto the aluminum layer using a DC magnetron with dual targets or alloy targets. Alternatively, these layers can be deposited by chemical vapor deposition, electron beam evaporation, or other techniques known in the art.

The passivation layer 18 is deposited on the silver layer 16 and is formed from the same group of materials as the adhesion layer 14. The adhesion layer 14 and passivation layer 18 in a multilayer may have the same composition, or the two layers may be different. As stated above, changing the ratio of Ni:Cr can increase the durability of the layer (at higher ratios) and decrease the absorption of the layer 18 (at lower ratios). The lower absorption allows more reflection from the aluminum and silver layers underneath. For a mirror subjected to a particularly harsh environment, it may be advantageous to use a higher Ni:Cr material for the passivation layer, which is closer to the top of the multilayer stack (and the environment), while using a lower Ni:Cr material for the adhesion layer underneath.

The preferred passivation layer 18 is $NiCrN_x$, having a thickness of about 0.5–1.0 nm (5–10 Å). The passivation layer 18 chemically bonds with the silver layer 16 to form an admixture that is not subsequently reactive with environmental contaminants, such as chlorine or sulfur compounds that are frequently found in ambient air. The passivation layer 18 protects the silver layer 16 by physically blocking the migration of contaminating species from the atmosphere to the silver. Contaminating species include chlorine (e.g., HCl, salt fog), water, sulfates (e.g., $H_2SO_4$), sulfur, nitrates, and oxygen in its various forms (e.g., $O_3$).

In addition to the passivation layer 18, the silver layer 16 is mechanically protected from tarnishing by the durability layer or layers 20a–d. These layers 20a–d act as a barrier to contaminants and provide mechanical stability. The first durability layer is preferably silicon nitride, which may be followed by a series of layers of various metal oxides. Suitable oxides include silica ($SiO_2$), alumina ($AlO_3$), niobia ($NbO_x$), titania ($TiO_2$), zirconia ($ZrO_2$), tantala ($Ta_2O_5$), and oxides of more than one metal (composite metal oxides), such as tantala hafnia ($TaHfO_x$). Niobium oxide forms a low-stress film and is used in applications for extremely high light intensities since it is inherently more resistant to stress-induced failures. Niobium oxide is also highly resistant to solarizing, or the forming of color centers of displaced lattice atoms. Tantalum-hafnium oxides are particularly advantageous due to a unique combination of beneficial properties: high refractive index and low absorption, especially in the ultraviolet region.

If the first durability layer 20a is silicon nitride, then the next layer (e.g., 20b) may be silicon oxinitride ($SiO_xN_y$), followed by a layer of silicon dioxide 20c ($SiO_2$). The oxinitride then serves as a compatibility or transition layer that creates a better bond between the silicon nitride and the silicon oxide. Better bonding allows the coating to pass the snap tape and wet cheesecloth test. The preferred thickness of this transition layer is about 30–75 Å, which allows the bonding to occur without interfering with (degrading) the optical properties (reflectance) of the mirror. The silicon oxinitride can be fabricated by sputtering silicon in a gas mix of 75% $N_2$ and 25% $O_2$.

The thickness of the silicon nitride film is typically in the range of 0–0.3 nm (30 Å). Silicon nitride is a very dense film and provides mechanical strength. If the subsequent metal oxide layers are deposited by sputtering in the presence of oxygen, then the silicon nitride layer is necessary to act as a barrier to the diffusion of atomic oxygen produced in the deposition process. If the oxides are deposited by electron beam evaporation, then the silicon nitride layer is not required since free oxygen is not present to contaminate the silver layer. It is critical to keep oxygen ($O_2$, $O_3$) and its ions ($O^{2-}$) away from the silver layer, since silver reacts with oxygen to form silver oxide, which is less reflective than the silver thin film. The use of a nitride film is preferred, as it permits the subsequent overcoating of metal oxide layers without compromising the pre-existing silver layer.

In an alternative embodiment, the first durability layer may comprise a silicon aluminum nitride ($SiAlN_x$), an aluminum nitride, or two or more alternating layers of silicon nitride and aluminum nitride. The weight ratio of silicon to aluminum (Si:Al) in the composite silicon aluminum nitride can be varied depending on the particular application. For example, aluminum nitride is typically water soluble (unless deposited at high substrate temperatures), and thus would not be used in humid environments. High aluminum content would be favored in a dry environment.

If the first durability layer 20a is an aluminum nitride or $SiAlN_x$ layer, then the next layer 20b may be aluminum oxinitride ($AlON_x$) or silicon aluminum oxinitride ($SiAlO_xN_y$), followed by a layer 20c of aluminum oxide ($AlO_3$) or silica. The oxinitride then serves as a compatibility or transition layer 20b that can bond easily to both the aluminum nitride and the alumina or silica.

The use of the $NiCrN_x$ passivation layer with the silicon (and/or aluminum) nitride durability layer reduces the reflectance of the overall silver-aluminum multilayer mirror. This reflectance is recovered to some degree by using standard metal oxide layer techniques to restore the broadband reflectivity. These techniques are widely known in the optical coating industry and are not elaborated here.

Figure 3:
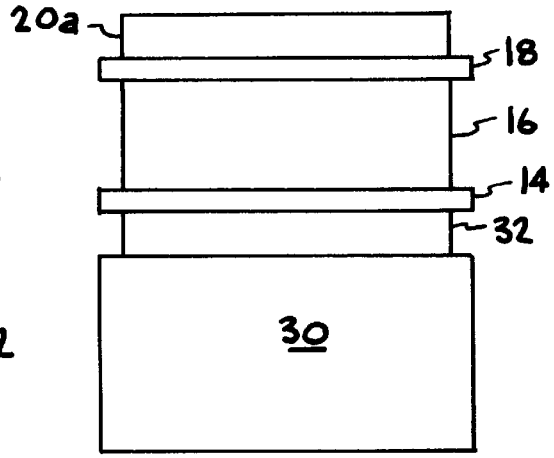
FIG. 3 shows a cross-section of an alternative embodiment of the thin film multilayer mirror according to the present invention.

FIG. 3 shows another embodiment of the multilayer mirror with a substrate 30 formed of highly polished aluminum and a layer 32 of amorphous silicon dioxide ($a$-$SiO_2$) deposited on the surface. The glass layer 32 typically has a thickness less than about 25 nm (250 Å). The amorphous silica in combination with the adhesion layer 14 serves to prevent a galvanic cell from forming between the two metal layers 30, 16 (Al and Ag), and may also form a smoother optical surface. The multilayer stack is completed by depositing a passivation layer 18 and durability layer 20a. In certain applications (e.g., space, non-corrosive environments), a single nitride durability layer 20a will provide sufficient protection for the underlying silver layer 16, and no further metal oxide or nitride layers are deposited.

Figure 4:
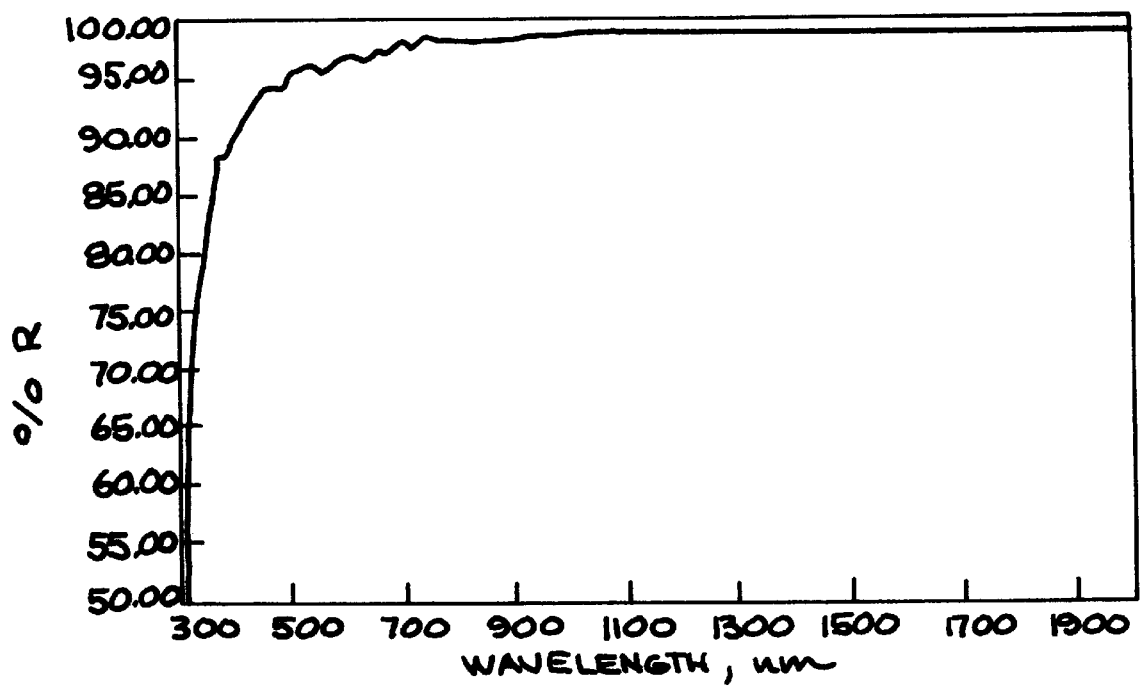
FIG. 4 shows the reflectance v. wavelength of a multilayer mirror according to the present invention.

FIG. 4 shows the reflectance (normal incidence) as a function of wavelength (300–2000 nm) for a multilayer having five layers: $Al/NiCrN_x/Ag/NiCrN_x/SiN_x$. The aluminum layer is 70 nm (700 Å) thick, the silver layer is 33 nm (330 Å) thick, the $NiCrN_x$ (80 Ni:20 Cr) layers are 0.5 nm (5 Å) thick, and the $SiN_x$ layer is 3 nm (30 Å) thick.

Figure 5:
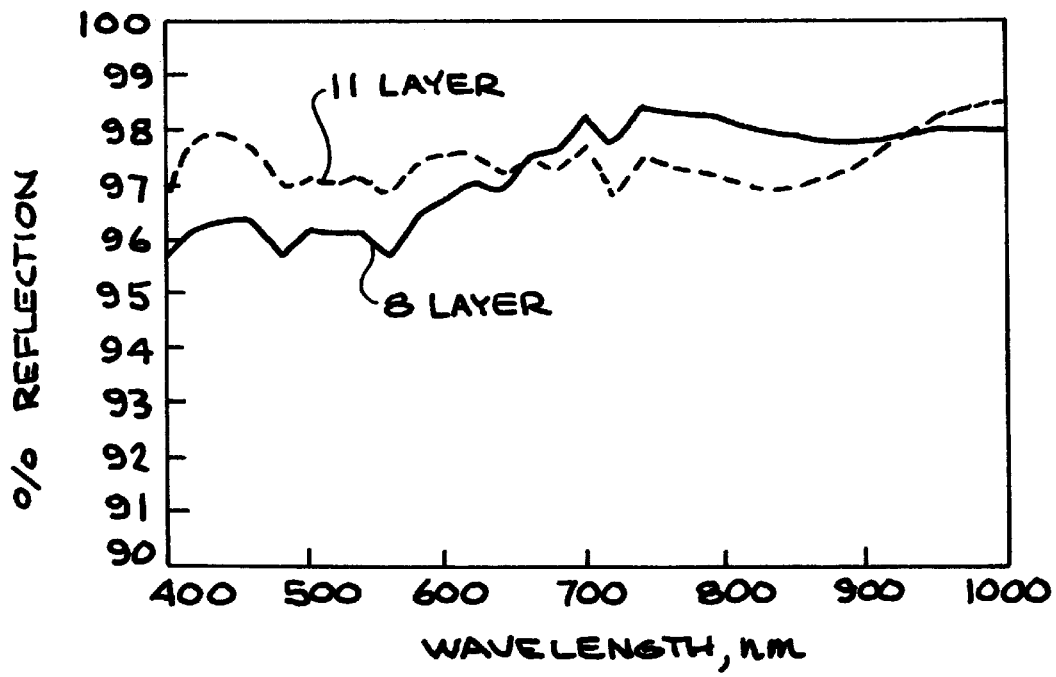
FIG. 5 shows the reflectance v. wavelength of 8-layer and 10-layer multilayer mirrors according to the present invention.

FIG. 5 shows the reflectance (normal incidence) as a function of wavelength (400–1000 nm) for two multilayers mirrors. One mirror has eight layers on top of an aluminum substrate: $Al/NiCrN_x/Ag/NiCrN_x/SiN_x/SiO_xN_y/SiO_2/NbO_x/SiO_2$. The silver layer is 34 nm thick, the $NiCrN_x$ (20 Ni:80 Cr) layers are 0.5 nm thick, the $SiN_x$ layer is 3 nm thick, and the thicknesses of the four oxide layers in order are 3 nm (oxinitride transition layer), 49.5 nm, 49.5 nm, and 130 nm. The other mirror has eleven layers on top of an aluminum substrate: $Al/NiCrN_x/Ag/NiCrN_x/SiN_x/SiO_xN_y/SiO_2/NbO_x/TiO_2/SiO_2/NbO_x/SiO_2$. The silver layer is 34 nm thick, the $NiCrN_x$ (20 Ni:80 Cr) layers are 0.5 nm thick, the $SiN_x$ layer is 3 nm thick, and the thicknesses of the seven oxide layers in order are 3 nm (oxinitride transition layer), 67 nm, 30 nm, 18 nm, 56 nm, 35 nm, and 120 nm.

Figure 6:
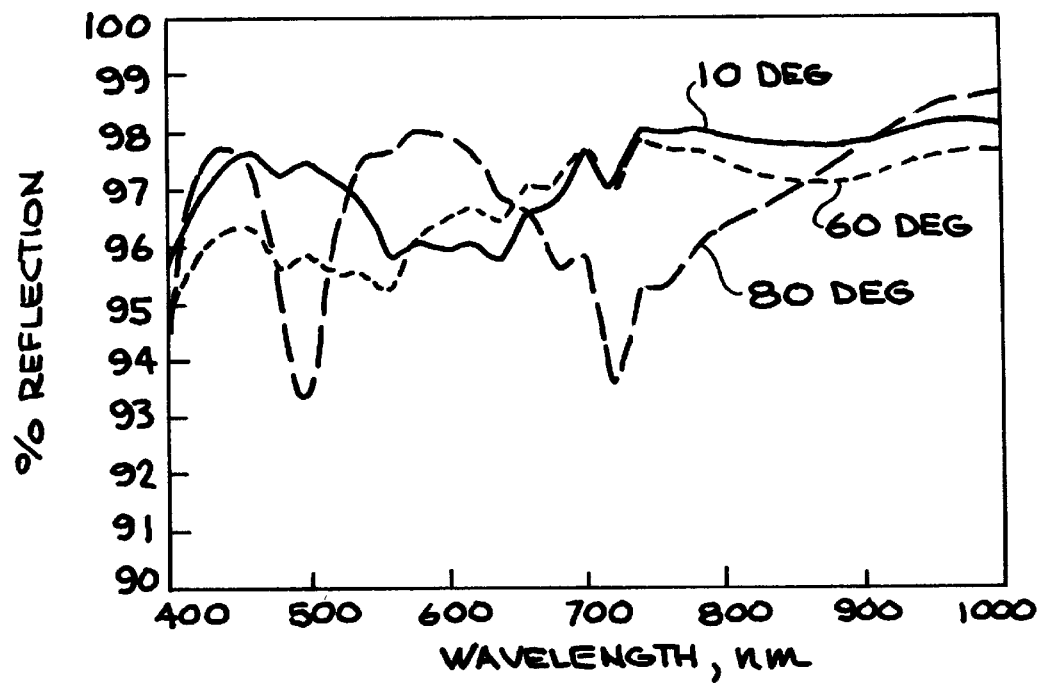
FIG. 6 shows the reflectance v. wavelength of the 8-layer multilayer mirror at angles of incidence of 10°, 60°, and 80°.

FIG. 6 shows the reflectance as a function of wavelength for the eight-layer design shown in FIG. 5 for incidence angles of 10°, 60°, and 80°. Even at varying incidence angles, the mirror reflects greater than 90% of the incident light.

Figure 7:
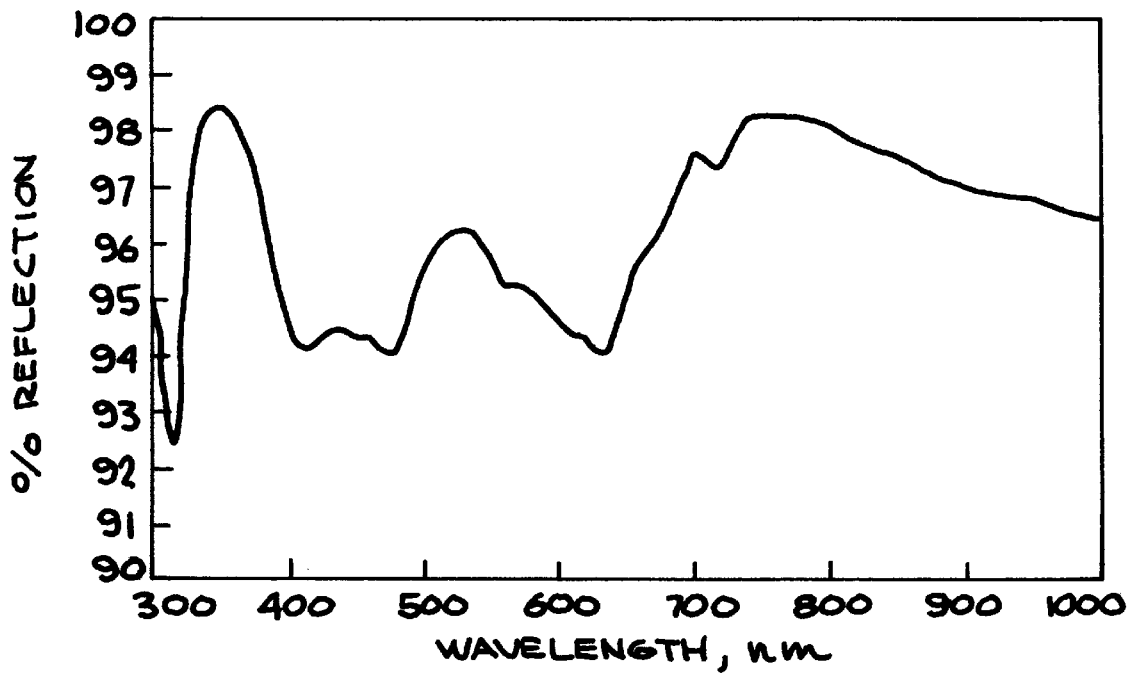
FIG. 7 shows the reflectance v. wavelength of a 15-layer multilayer mirror according to the present invention.

FIG. 7 shows the reflectance (normal incidence) as a function of wavelength (300–1000 nm) for a multilayer mirror having fifteen layers on top of an aluminum substrate: $Al/NiCrN_x/Ag/NiCrN_x/SiN_x/SiO_xN_y/SiO_2/TaHfO_x/TiO_2/SiO_2/TaHfO_x/SiO_2/TaHfO_x/SiO_2/ZrO_2/SiO_2$. The silver layer is 34 nm thick, the $NiCrN_x$ (20 Ni:80 Cr) layers are 0.5 nm thick, the $SiN_x$ layer is 3 nm thick, and the thicknesses of the eleven oxide layers in order are 3 nm (oxinitride transition layer), 38 nm, 11.8 nm, 20 ni, 50.6 nm, 34 nm, 55 nm, 33 nm, 46 nm, 42 nm, and 93 nm.

The foregoing description of preferred embodiments of the invention is presented for purposes of illustration and description and is not intended to be exhaustive or to limit the invention to the precise form disclosed. Many modifications and variations are possible in light of the above teaching.

What is claimed is:

1. A reflective mirror having high reflectance over a large spectral range, comprising:

a substrate comprising at least a reflective layer of aluminum on its surface;

an adhesion layer deposited on the aluminum surface comprising a material selected from the group consisting of nickel, nickel nitride, chromium, chromium nitride, nickel-chromium alloys, and nickel-chromium nitride;

a second reflective layer comprising silver deposited on the adhesion layer;

a passivation layer deposited on said second reflective layer comprising a material selected from the group consisting of nickel, nickel nitride, chromium, chromium nitride, nickel-chromium alloys, and nickel-chromium nitride; and at least one durability layer deposited on the passivation layer comprising a material selected from the group consisting of metal oxides and metal nitrides.

2. The mirror as recited in claim 1, wherein the aluminum layer has a thickness of at least about 70 nm.

3. The mirror as recited in claim 1, wherein the substrate consists essentially of aluminum.

4. The mirror as recited in claim 1, wherein the silver layer has a thickness in the range of about 10–100 nm.

5. The mirror as recited in claim 1, wherein the adhesion layer has a thickness in the range of about 0.5–10 nm.

6. The mirror as recited in claim 5, wherein the adhesion layer is not continuous over the entire aluminum surface.

7. The mirror as recited in claim 1, wherein the passivation layer has a thickness in the range of about 0.5–10 nm.

8. The mirror as recited in claim 1, wherein the durability layer deposited on the passivation layer comprises a nitride selected from the group consisting of silicon nitride, aluminum nitride, and silicon aluminum nitride.

9. The mirror as recited in claim 8, wherein the durability layer further comprises an oxinitride layer deposited on the nitride layer.

10. The mirror as recited in claim 8, wherein the durability layer further comprises a plurality of layers of metal oxides.

11. The mirror as recited in claim 1, wherein the durability layers deposited on the passivation layer comprise a layer of silicon nitride, a layer of silicon oxinitride, and a layer of silicon dioxide.

12. The mirror as recited in claim 1, wherein the durability layers deposited on the passivation layer comprise a layer of silicon aluminum nitride, a layer of silicon oxinitride, and a layer of silicon dioxide.

13. The mirror as recited in claim 1, wherein the durability layers deposited on the passivation layer comprise a layer of aluminum nitride, a layer of aluminum oxinitride, and a layer of aluminum oxide.

14. The mirror as recited in claim 1, wherein the durability layers comprise a plurality of layers of metal oxides.

15. The mirror as recited in claim 14, wherein the durability layers comprise metal oxides selected from the group consisting of silicon dioxide, titanium dioxide, aluminum oxide, tantalum hafnium oxide, tantalum oxide, niobium oxide, zirconium oxide, and mixtures thereof.

16. The mirror as recited in claim 1, wherein the mirror reflects light in the spectral range of about 300 nm to 10000 nm.

17. The mirror as recited in claim 1, wherein the mirror reflects at least about 90% of light incident thereon.

18. The mirror as recited in claim 1, wherein the mirror reflects at least about 90% of all normally incident light for each wavelength in the range of 300–10000 nm.

19. The mirror as recited in claim 1, further comprising a layer of amorphous silicon dioxide deposited on the aluminum surface before the deposition of the adhesion layer.

20. The mirror as recited in claim 19, wherein the layer of amorphous silicon dioxide has a thickness less than about 25 nm.

21. A method for forming a reflective mirror having high reflectance over a large spectral range, comprising:

providing a substrate comprising at least a reflective layer of aluminum on its surface;

depositing an adhesion layer on the aluminum surface comprising a material selected from the group consisting of nickel, nickel nitride, chromium, chromium nitride, nickel-chromium alloys, and nickel-chromium nitride;

depositing a second reflective layer comprising silver on the adhesion layer;

depositing a passivation layer on the silver layer comprising a material selected from the group consisting of nickel, nickel nitride, chromium, chromium nitride, nickel-chromium alloys, and nickel-chromium nitride; and depositing at least one durability layer on the passivation layer comprising a material selected from the group consisting of metal oxides and metal nitrides.

22. The method as recited in claim 21, wherein depositing a first durability layer comprising a metal nitride is carried out by sputtering, and further comprising depositing a second durability layer by sputtering, wherein the second durability layer comprises a metal oxide.

23. The method as recited in claim 21, wherein depositing a first durability layer comprising a metal oxide is carried out by electron beam evaporation.

24. The method as recited in claim 21, wherein the adhesion layer comprises a material selected from the group consisting of nickel chromium alloys and nickel chromium nitrides, and further comprising selecting a nickel:chromium weight ratio.

25. The method as recited in claim 21, wherein the passivation layer comprises a material selected from the group consisting of nickel chromium alloys and nickel chromium nitrides, and further comprising selecting a nickel:chromium weight ratio.

26. The method as recited in claim 21, wherein a first durability layer comprises silicon aluminum nitride, and further comprising selecting a silicon:aluminum weight ratio.

27. The method as recited in claim 21, further comprising depositing a layer comprising amorphous silicon dioxide on the aluminum surface before depositing the adhesion layer.

28. The method as recited in claim 21, further comprising providing the substrate essentially consisting of aluminum.

* * * * *